United States Patent
Jeong et al.

(10) Patent No.: US 6,860,118 B2
(45) Date of Patent: Mar. 1, 2005

(54) METHOD FOR FABRICATING SILICA GLASS USING SOL-GEL PROCESS

(75) Inventors: Won-II Jeong, Kumi-shi (KR); Jeong-Hyun Oh, Taegu-Kwangyokshi (KR); Jung-Je Bang, Kumi-shi (KR); Young-Min Baik, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 10/179,704

(22) Filed: Jun. 25, 2002

(65) Prior Publication Data

US 2003/0089131 A1 May 15, 2003

(30) Foreign Application Priority Data

Nov. 13, 2001 (KR) ........................................ 2001-70583

(51) Int. Cl.⁷ .......................... C03B 8/00; C03B 37/016
(52) U.S. Cl. .......................................... 65/17.2; 65/395
(58) Field of Search ........................ 65/440, 395, 17.2, 65/426; 423/338

(56) References Cited

U.S. PATENT DOCUMENTS

| | | | |
|---|---|---|---|
| 4,419,115 A | * 12/1983 | Johnson et al. | 65/395 |
| 4,680,049 A | * 7/1987 | Onorato et al. | 65/395 |
| 4,789,389 A | * 12/1988 | Schermerhorn et al. | 65/390 |
| 5,145,507 A | * 9/1992 | Kyoto et al. | 65/398 |
| 5,236,483 A | * 8/1993 | Miyashita et al. | 65/17.2 |
| 5,453,104 A | * 9/1995 | Schwabel | 51/293 |
| 5,912,397 A | * 6/1999 | Baik et al. | 65/17.2 |
| 2001/0009102 A1 | 7/2001 | Oh et al. | |
| 2003/0024277 A1 | * 2/2003 | Costa et al. | 65/395 |

FOREIGN PATENT DOCUMENTS

| | | | | |
|---|---|---|---|---|
| EP | 0583943 A2 | | 8/1993 | C03B/19/12 |
| EP | 1283195 A1 | * | 2/2003 | C03B/19/12 |
| GB | 2165234 A | | 4/1986 | C03B/8/02 |
| JP | 2003-146666 | * | 5/2003 | C03B/8/02 |

OTHER PUBLICATIONS

Machine translation of JP 2003–146666. (May 21, 2003).*

* cited by examiner

*Primary Examiner*—Steven P. Griffin
*Assistant Examiner*—Carlos Lopez
(74) *Attorney, Agent, or Firm*—Cha & Reiter, L.L.C.

(57) ABSTRACT

The present invention discloses a method for fabricating silica glass using a sol-gel process, which includes a sol forming step for forming a sol by mixing a starting material, deionized water and an additive together; gelation step for gelatinizing the sol after filling a circular mold with the gel produced; gel drying step for separating the gel from the circular mold and drying the gel; setting step for placing the gel inside of a heat chamber and injecting helium gas into the heat chamber; and low heat treatment step for pressurizing and depressurizing an internal pressure of the heat chamber repeatedly for several times.

13 Claims, 8 Drawing Sheets

METHOD FOR FABRICATING SILICA GLASS USING SOL-GEL PROCESS

PRIORITY

This application claims priority to an application entitled "Method for Fabricating Silica Class Using Sol-Gel Process" filed in the Korean Industrial Property Office on Nov. 13, 2001 and assigned Serial No. 2001-70583, the contents of which are hereby incorporated by reference.

BACKGROUND OF THE INVENTION

1. Field of the Invention

The present invention relates to a method for fabricating silica glass. In particular, the present invention relates to a method for fabricating silica glass using a sol-gel process.

2. Description of the Related Art

With regard to advances in telecommunication systems, optical communication systems have drawn a lot of attention in the relevant industries because these systems successfully perform at very high transmission speeds with little loss of optical signals. Such optical communication systems typically use an optical fiber fetched from a perform made of silica glass as a transmission media.

In general, the silica glass is fabricated by one of a natural quartz process, synthetic quartz process, or sol-gel process. More details on the sol-gel process can be found in U.S. Pat. No. 5,240,488, to Edwin A. Chandross et al., entitled Manufacture of Vitreous Silica Product Via A Sol-Gel Process Using A Polymer Additive, the contents of which are hereby incorporated by reference as background material.

FIG. 1 provides a flowchart providing an overview of a method for fabricating silica glass using a sol-gel process according to the prior art. The fabrication method includes a sol forming step 110, a sol filling step 120, a gel drying step 130, a low heat treatment step 140, and a sintering step 150.

The sol forming step 110 involves mixing a starting material, deionized water, and an additive to form a sol. As the starting material, a fumed silica or silicone alkoxide can be used. As for the additive, any of a dispersion agent, a catalyst or a binder can be used.

The sol filling step 120 involves filling a circular mold with the sol produced by the forming step 110. Here, the circular mold has a cylindrical shape, and a separable rod is arranged at the center of the circular mold. That is to say, the sol fills inside of the circular mold except for the rod. Later, the sol is gelatinized inside of the circular mold.

The gel drying step 130 involves drying the gel after separating the gel from the circular mold. The gel drying step 130 is performed in a temperature & humidity chamber that maintains a constant temperature and relative humidity.

In the low heat treatment step 140, the dried gel is placed in a low-heating device, and goes through a heat treatment at a temperature of 900° C. as the presence of chloride gas is injected to the inside of the low heat device. Afterwards, the remaining moisture inside of the gel and other organic matters like the binder are decomposed, and any metallic impurities and hydroxyl radicals (OH) in the gel are removed.

The sintering step 150 involves performing a vitrification process on the gel by applying heat to the gel subsequent to performing the low heat treatment step 140. The sintering step 150 is performed by heating the dry gel at a temperature over 1300° C. and moving the gel up and down in the sintering furnace under the helium (He) gas or vacuum atmosphere.

FIG. 2 graphically illustrates scattering characteristics of the silica glass according to the prior art. The graph was obtained by mounting a sample of the silica glass on a spectrometer, and light was made incident onto one side of the sample, and a spectrum analysis was made of the transmitted light. In the graph, the scattering distance indicates a relative measurement position, and the scattering intensity indicates the intensity of the scattered light at a corresponding measurement position. As depicted in FIG. 2, a large number of points appear with a maximum intensity being dependent on the measurement position. Each maximum intensity point exhibits a maximum scattering intensity at the corresponding measurement position. Such scattering phenomenon is caused by micro bubbles existing inside of the silica glass. As previously discussed with reference to FIG. 1, the low heat treatment step was originally carried out on the gel in a chlorine gas atmosphere in order to decompose the remaining moisture and organic matters, such as the binder inside of the gel, and to remove any metallic impurities and hydroxyl radicals (OH). Unfortunately, the chlorine gas is not completely removed, and thus remains inside of the silica glass, causing the micro bubbles to be formed therein.

FIG. 3 is a view illustrating part of a fault of the silica glass fabricated in accordance with the related art. As shown in the figure, the white spots are the micro bubbles formed in the silica glass. Primarily, the micro bubbles are the reason that the optical signals that are supposed to progress inside of the silica glass are scattered, and the cracking and micro-bending of the silica glass occur due to the changes in the ambient temperature.

As described above, the major problem of the traditional method for fabricating silica glass using a sol-gel process is that micro bubbles are produced inside of the silica glass because of the remaining chlorine gas after the low heat treatment step.

SUMMARY OF THE INVENTION

The present invention relates to a method for fabricating silica glass using a sol-gel process that enables to suppress formation of micro bubbles inside of the silica glass, and to decrease the number and size of the micro bubbles.

According to one aspect of the invention, there is provided a method for fabricating silica glass using a sol-gel process, which includes sol forming step for forming a sol by mixing a starting material, deionized water and an additive; a gelation step for gelatinizing the sol after filling a circular mold with the gel produced; a gel drying step for separating the gel from the circular mold and drying the gel; a setting step for placing the gel inside of a heat chamber and injecting helium gas into the heat chamber; and a low heat treatment step for repeatedly pressurizing and depressurizing the heat chamber several times.

BRIEF DESCRIPTION OF THE DRAWINGS

The foregoing and other features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENT

Figure 1:
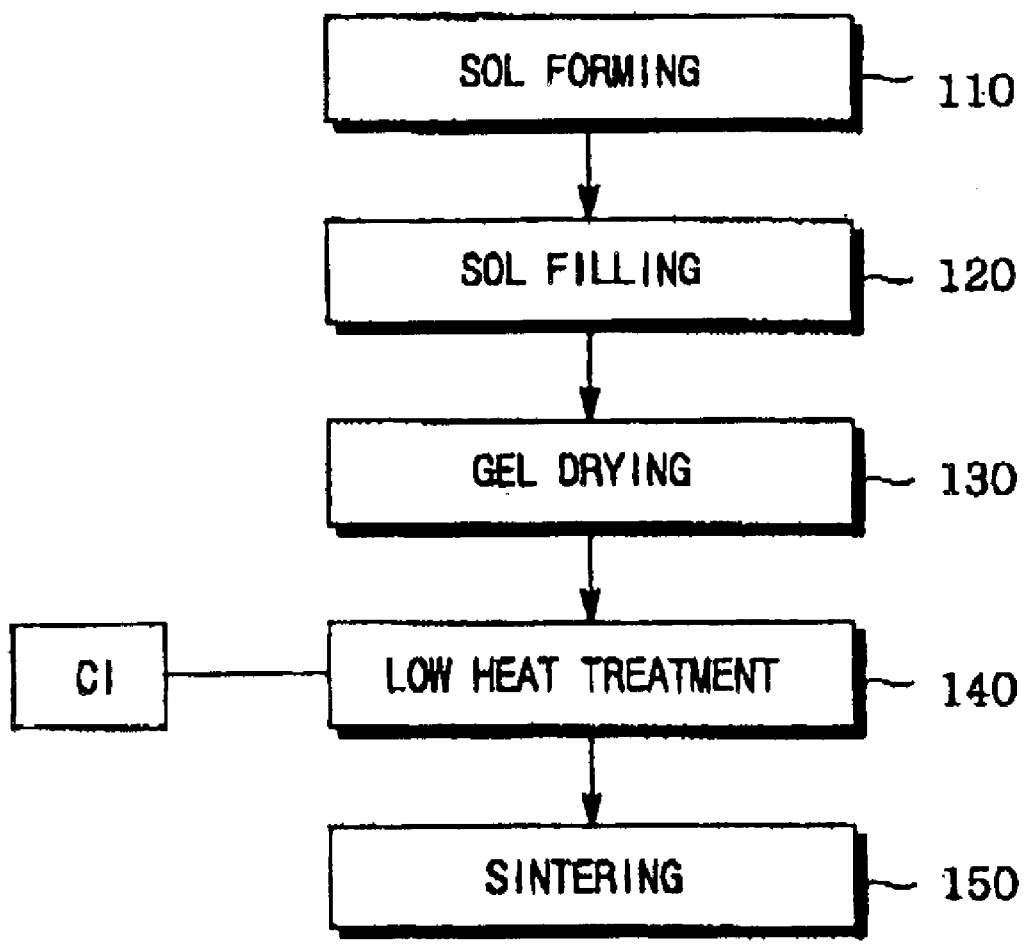
FIG. 1 diagrammatically shows a method for fabricating silica glass using a sol-gel process according to the prior art.

A preferred embodiment of the present invention will now be described with reference to the accompanying drawings. In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 4:
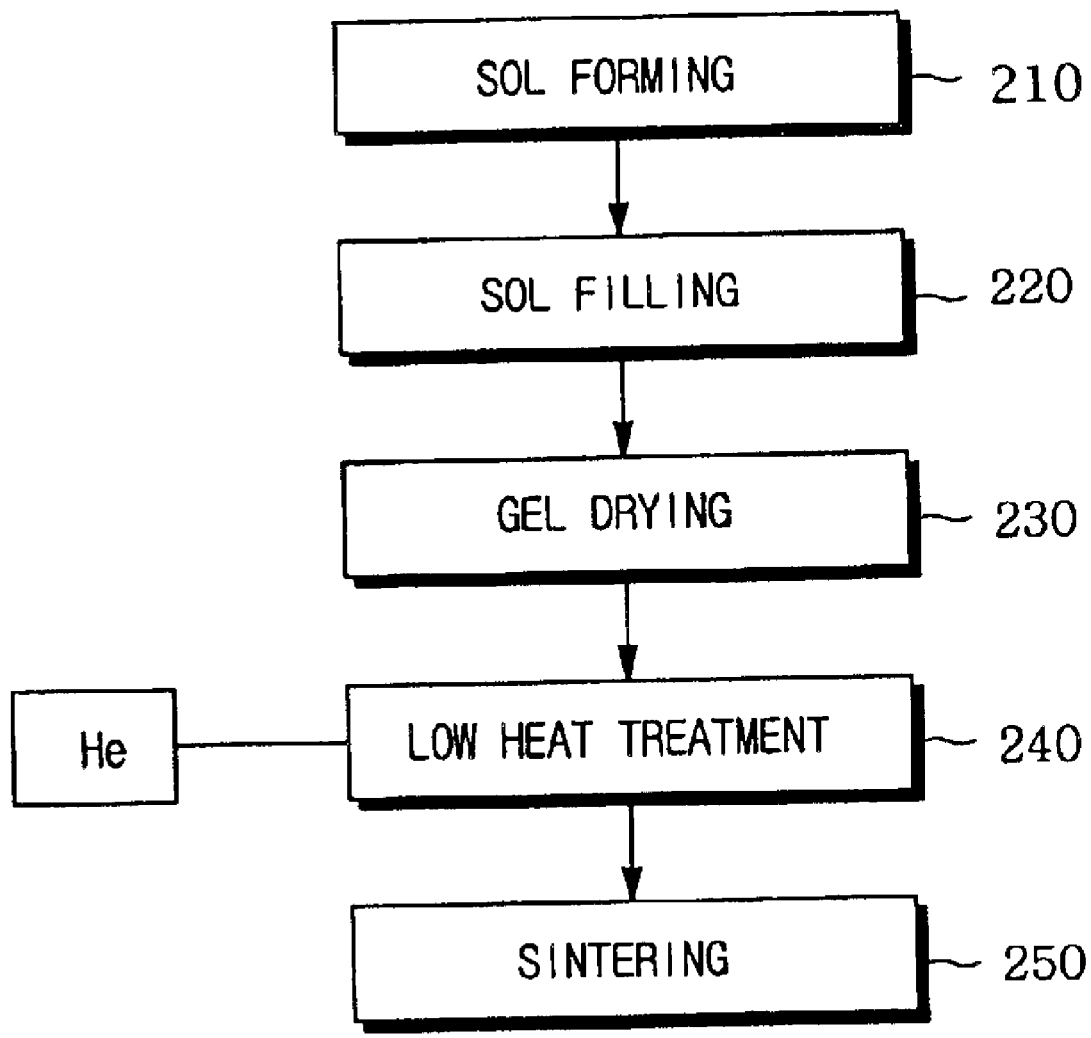
FIG. 4 is a diagrammatic view showing a method for fabricating silica glass using a sol-gel process according to a preferred embodiment of the present invention.

FIG. 4 is a diagrammatic view showing a method for fabricating silica glass using a sol-gel process according to a preferred embodiment of the present invention.

The fabrication method includes a sol forming step 210, a sol filling step 220, a gel drying step 230, allow heat treatment step 240, and a sintering step 250.

The sol forming step 210 involves mixing a starting material, deionized water, and an additive to form a sol. As the starting material, a fumed silica or silicone alkoxide can be used. As for the additive, a dispersion agent, catalyst or binder can be used.

The sol filling step 220 involves filling a circular mold with the sol produced by the sol forming step 210. Here, the circular mold has a cylindrical shape, and a separable rod is positioned at the center of the circular mold. That is to say, the sol fills inside of the circular mold except for the rod. Later, the sol is gelatinized inside of the circular mold.

The gel drying step 230 involves drying the gel after separating the gel from the circular mold. The gel drying step 230 is performed in a temperature and humidity chamber that maintains a constant temperature and relative humidity.

Figure 5:
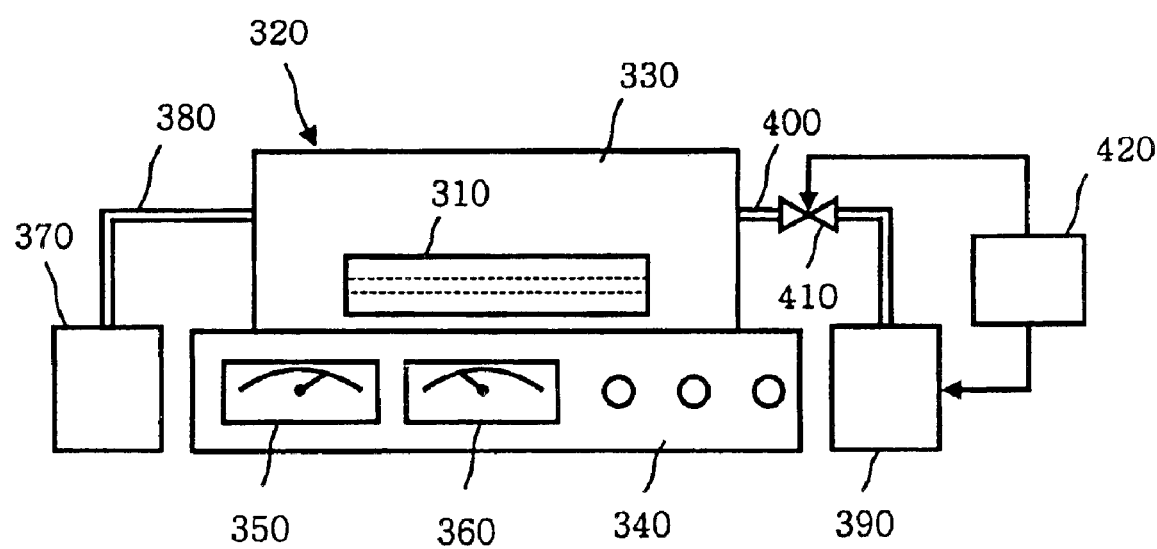
FIG. 5 is a schematic diagram showing a constitution of a system for use of a low heat treatment step introduced in FIG. 4.

FIG. 5 is a schematic diagram showing a constitution of a system for use of the low heat treatment step 240. The system includes a low heat treatment device 320; a pressurizing device 370 being connected to an internal heat chamber 330 through an induction pipe 380; a depressurizing device 390 being connected to an internal heat chamber 330 through an exhaust pipe 400; a throttle valve 410; and a switch 420.

The low heat treatment device 320 includes the heat chamber 330 at the upper portion of the device, and a control panel 340 at the low portion of the device.

The heat chamber 330 is mounted with a heater (not shown) and a cooler (not shown), through which a user can optionally adjust the internal temperature. A preferable heater that can be suitable for use can be a heating wire or a heating plate mounted on the inside of the heat chamber 330. For example, the internal temperature of the heat chamber 330 can be raised up to a predetermined temperature by applying a current to the heating wire. As for the cooler, on the other hand, a cooling line 330 is installed at the inside of a wall of the heat chamber 330. By circulating cooling water through the cooling line, it is possible to lower the internal temperature of the heat chamber 330 to a predetermined temperature.

The control panel 340 is mounted with a thermometer 350 for indicating the internal temperature of the heat chamber 330, and a manometer 360 for indicating the internal pressure of the heat chamber 330.

The pressurizing device 370 increases the internal pressure of the heat chamber 330 through the induction pipe 380. A preferable pressurizing device 370 is a helium tank, in which helium gas is compressed into a liquid phase, and the liquid helium is preserved in the helium tank. Since the compressed helium inside of the helium tank is at a high pressure, if one wishes to use the helium tank as the pressurizing device according to the present invention, he should depressurize the helium according to need.

The depressurizing device 390 decreases the internal pressure of the heat chamber 330 through the exhaust pipe 400. Preferably, a vacuum pump is used for the depressurizing device 390. Depending on the vacuum level, the vacuum pump used is largely divided into three different kinds: a low vacuum pump, a high vacuum pump, and a super high vacuum pump. More specifically, the low vacuum pump is in a vacuum range of from 760 torr to $1 \times 10^{-3}$ torr, and the high vacuum pump is in a vacuum range of from $1 \times 10^{-3}$ torr to $1 \times 10^{-8}$ torr, and the super high vacuum pump is in a vacuum range of from $1 \times 10^{-8}$ torr and below.

As for the low vacuum pump, a rotary pump is often used. Basically, the rotary pump is lubricated to maintain the induction chamber airtight, and the air inside of the chamber is exhausted to the outside through a volume exhaust via rotation. Meanwhile, an oil diffusion pump, which is one of the high vacuum pumps, does not work during general atmospheric pressure conditions. In fact, the oil diffusion pump first exhausts most of air to another pump like the rotary pump, and starts to work when the vacuum pressure is at least $10^{-3}$ torr. If the gas pressure is too high, the oil molecules might collide with other gas molecules many times and stop moving in the middle of the operation. This is why the pressure at the induction opening should be lower than $10^{-3}$ torr. On the other hand, the super high vacuum pump can be selected from a group including titanium sublimation pump, ion pump, or non-evaporable pump. Since the vacuum degree of the depressurizing device 390 of the present invention does not have to be so high, the rotary, one of the low vacuum pumps, might as well be employed.

The throttle valve 410 is mounted on a route of the exhaust pipe 400, opening or closing the exhaust pipe 400.

The switch 420, depending on how a user operates, opens and closes the throttle valve 410, and also turns on/off the depressurizing device 390.

Figure 6:
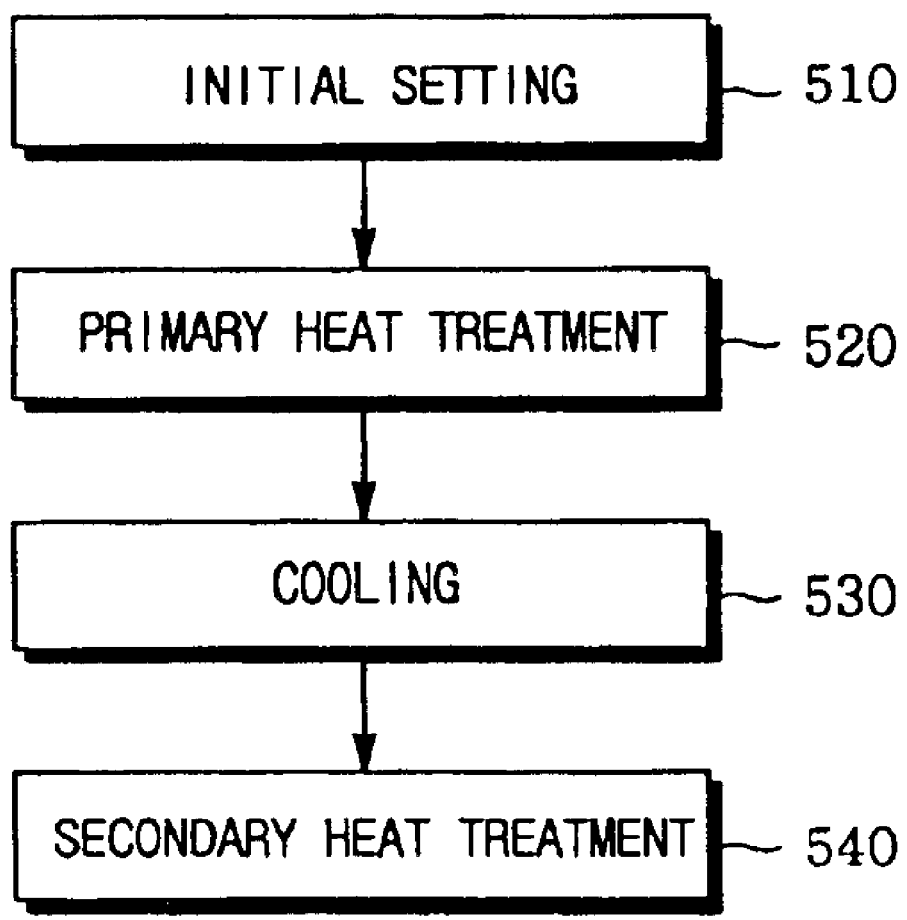
FIG. 6 diagrammatically shows a detailed procedure of the low heat treatment step introduced in FIG. 4.

FIG. 6 is a detailed diagram showing the low heat treatment step 240. As shown, the low heat treatment step includes an initial setting step 510, primary heat treatment step 520, cooling step 530, and secondary heat treatment step 540. The low heat treatment step 240 will now be described with reference to FIGS. 5 and 6.

First of all, in the initial setting step 510, the dry gel 310 that went through the gel drying step 230 is placed at the inside of the heat chamber 330. Using the depressurizing device 390, the internal heat chamber 330 is vacuumed, and subsequently filled with helium gas. At this time, the internal pressure of the heat chamber 330 is set up at somewhat higher than the atmospheric pressure, for example, 800 torr.

The primary heat treatment step 520 involves increasing the internal temperature of the heat chamber 330 by using the heater until the temperature reaches 900° C., by way of decomposing the remaining moisture and other organic matters like the binder inside of the gel 310, and removing any metallic impurities and hydroxyl radicals (OH—).

The cooling step 530 involves decreasing the internal temperature of the heat chamber 330 down to 600° C. by using the cooler.

The secondary heat treatment step 540 involves decreasing the internal pressure of the heat chamber 330 down to 60 torr by using the depressurizing device 390. Similarly, the internal pressure of the heat chamber can be increased to 930 torr by using the pressurizing device 370. This depressurizing and pressurizing step is repeated several times (i.e., 3 times). At this time, the internal temperature of the heat chamber 330 should maintain the temperature of 600° C.

Once the gel 310 goes through the low heat treatment step 240 described above, it turns out that the number of the remaining micro bubbles and their sizes became much smaller than those of the related art. In other words, using helium gas and repeating the depressurizing and pressurizing step can successfully minimize the percentage of the remaining gas inside of the gel 310, and compact the gel 310 by filling micro holes that are formed on the surface of the gel 310 with helium gas.

Again referring to FIG. 4, the sintering step 250 involves carrying out a vitrification process on the gel 310 by applying heat to it after the gel 310 went through the low heat treatment step 240. The sintering step 250 is carried out by heating the dry gel at a temperature over 1300° C. and moving the gel up and down in the sintering furnace under the helium (He) gas or vacuum atmosphere. Once the sintering step 250 is completed, a high-purity silica glass is obtained.

Figure 2:
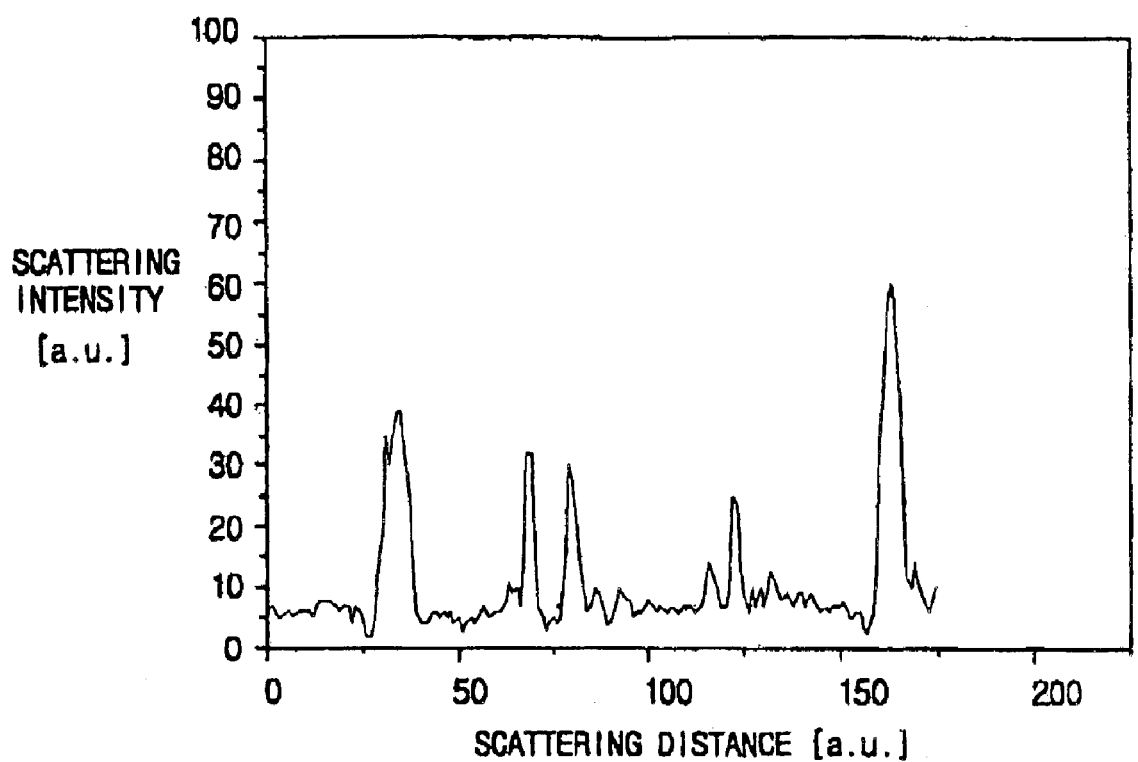
FIG. 2 is a graph showing scattering characteristics of silica glass according to the prior art.
Figure 7:
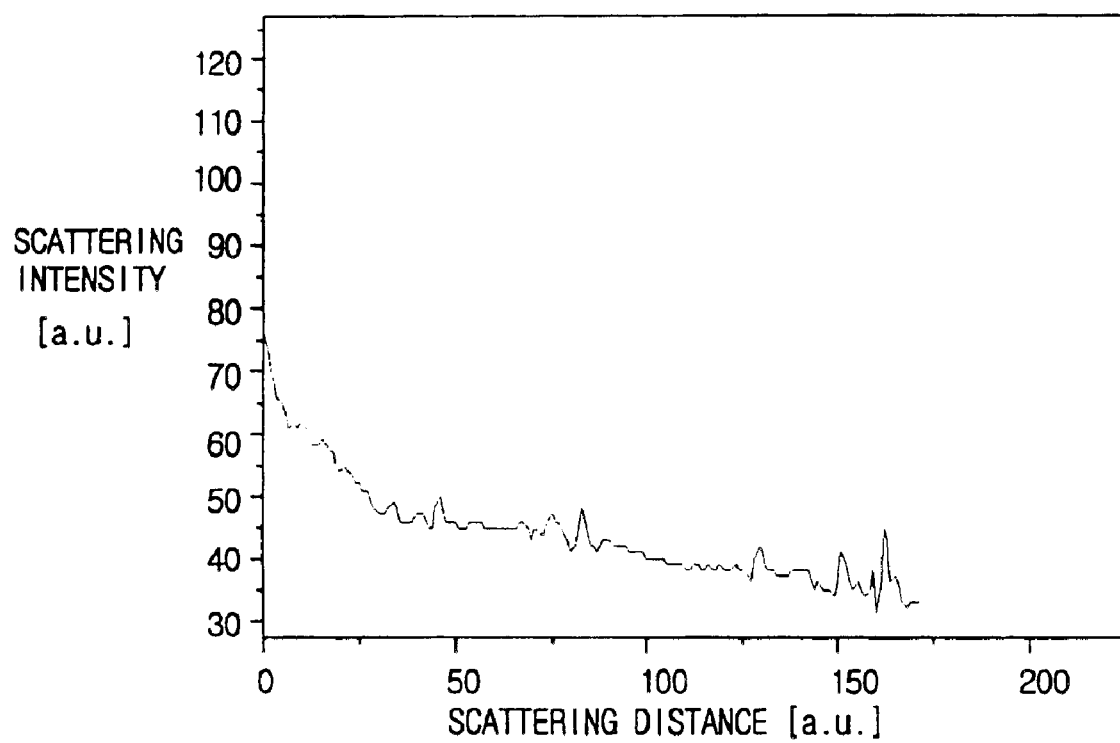
FIG. 7 is a graph showing scattering characteristics of silica glass fabricated according to the present invention.

FIG. 7 is a graph showing scattering characteristics of silica glass fabricated according to the present invention. The graph is obtained by mounting a sample of the silica glass on a spectrometer, and incidenting light onto one side of the sample, and making spectrum analysis on the transmitted light. In the graph, the scattering distance indicates a relative measurement position, and the scattering intensity indicates the intensity of the scattered light at a corresponding measurement position. Compared with the graph illustrated in FIG. 2, it is observed that the scattering intensity in different scattering distances is somewhat standardized in general, and the distinctive maximum intensity points of FIG. 2 are nowhere to be found.

Figure 3:
FIG. 3 is a diagrammatic view showing part of a fault of silica glass fabricated in accordance with the prior art.
Figure 8:
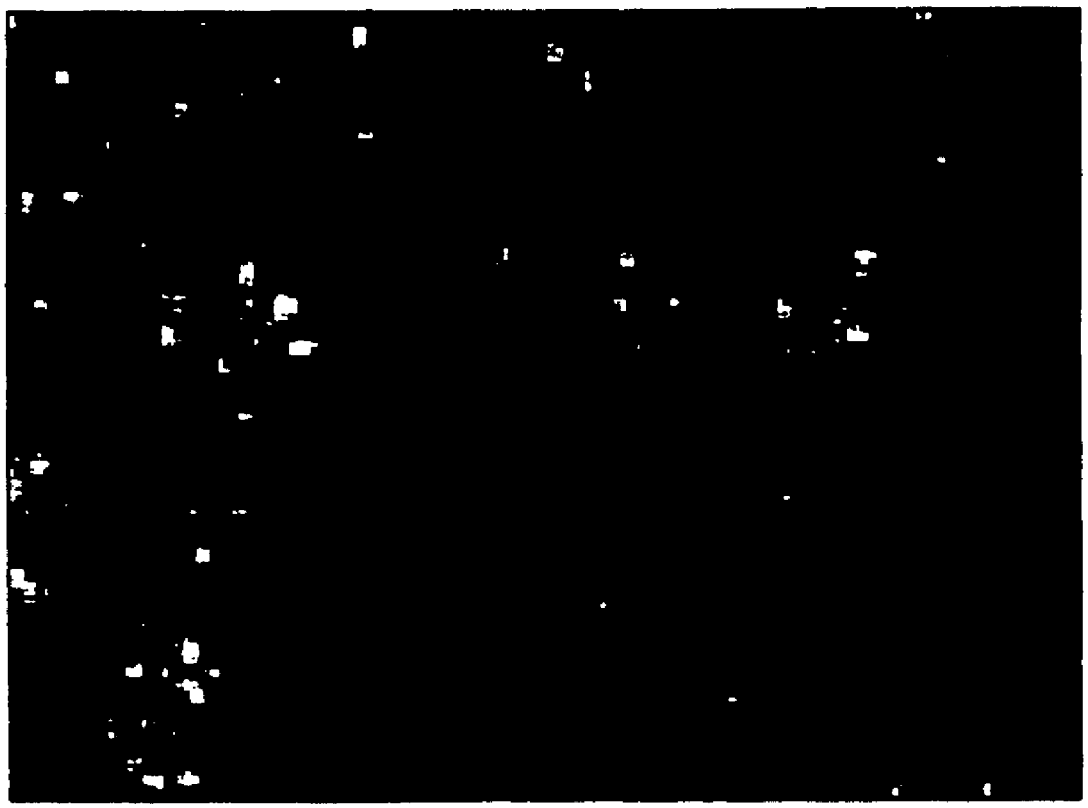
FIG. 8 is a diagrammatic view showing part of a fault of silica glass fabricated according to the present invention.

Finally, FIG. 8 diagrammatically shows part of a fault of silica glass, which is fabricated according to the present invention. As depicted in the FIG. 8, things that look like white spots are the micro bubbles formed in the silica glass. The micro bubbles are the main reason why the optical signals that are supposed to progress inside of the silica glass are scattered, and the crack and micro-bending occur to the silica glass due to the changes in the ambient temperature. Compared with FIG. 3, it is observed that the number of the micro bubbles and their size as a whole are greatly decreased.

In conclusion, the method for fabricating silica glass using a sol-gel process provided by the present invention is advantageous in that it successfully suppresses the formation of micro bubbles in the silica glass and decreases the number of the micro bubbles and their size in general, by carrying out the low heat treatment step under the helium gas atmosphere and repeating the depressurizing and pressurizing step several times during the low heat treatment step.

While the invention has been described in conjunction with various embodiments, they are illustrative only. Accordingly, many alternative, modifications and variations will be apparent to persons skilled in the art in light of the foregoing detailed description. For example, the pressure values for pressurizing and depressurizing does not mean that the invention could be practiced at variations of the amounts embodied in the specification. Moreover, the temperatures are not limited to the examples in the specification regarding primary heating, secondary heating, and could be different. Also, it is possible that a gas other than helium could be used, but helium is the best mode known to the inventors. In other words, the foregoing description is intended to embrace all such alternatives and variations falling with the spirit and broad scope of the appended claims, and should be interpreted with this in mind.

What is claimed is:

1. A method for fabricating silica glass having a decreased quantity and size of micro-bubbles using a sol-gel process, the method comprising the steps of:
   forming a sol by mixing a starting material, deionized water and an additive together;
   a gelation step for gelatinizing the sol after filling a circular mold with the gel produced;
   separating the gel from the circular mold and drying the gel;
   placing the gel inside of a heat chamber and injecting helium gas into the heat chamber;
   and a low heat treatment step for pressurizing and depressurizing an internal pressure of the heat chamber repeatedly for several times, said method further comprising the step of sintering the gel that has been through the low heat treatment by heating the gel at high temperature, wherein the low heat treatment step includes: (i) providing a primary heat treatment sub-step to heat the chamber to a first predetermined temperature; (ii) cooling to reduce the first predetermined temperature of the heat chamber to a second predetermined temperature that is lower than the first predetermined temperature; (iii) providing a secondary heat treatment sub-step by: (a) decreasing an internal pressure if the heat chamber to a predetermined value of depressurization; (b) increasing the internal pressure of the heat chamber to a subsequent predetermined value of pressurization; and (b) repeating sub steps (iii) a and (iii) (b) for a predetermined plurality of times.

2. The method according to claim 1, wherein the internal pressure is decreased in sub-step (iii)(a) to approximately 60 torr.

3. The method according to claim 1, wherein the internal pressure is increased in sub-step (iii)(b) to approximately 930 torr.

4. The method according to claim 1, wherein during the secondary heat treatment sub-step (iii) the temperature of the heat chamber is maintained at a constant value.

5. The method according to claim 1, wherein prior to providing the primary heat treatment sub-step the pressure of the heat chamber is increased to a initial value that is higher than atmospheric pressure.

6. The method according to claim 5, wherein the initial value of pressure in the heat chamber is approximately 800 torr.

7. The method according to claim 1, wherein subsequent to the separation of the gel from the mold in the gel drying step, the gel is maintained at a constant temperature and relative humidity.

8. A method for fabricating silica glass having a decreased quantity and size of micro-bubbles using a sol-gel process, the method comprising the steps of: forming a sol by mixing a starting material, deionized water and an additive together; gelatinizing the sol after filling a circular mold with the gel produced; separating the gel from the circular mold and drying the gel; placing the gel inside of a heat chamber and injecting helium gas into the heat chamber; and pressurizing and depressurizing an internal pressure of the heat chamber repeatedly for several times.

9. The method according to claim 8, further comprising a sintering step for sintering the gel subsequent to the pressurizing and depressurizing step that has repeated for several times by heating the gel at a high temperature.

10. The method according to claim 8, wherein the pressurizing and depressurizing is performed at least three times.

11. The method according to claim 8, wherein the pressure of the heat chamber is increased above atmospheric pressure prior to the pressurizing and depressurizing step.

12. The method according to claim 11, wherein the pressurizing and depressurizing occurs at a constant predetermined temperature.

13. The method according to claim 12, wherein the chamber is depressurized to approximately 60 torr during said depressurization, and pressurized to approximately 930 torr during said pressurization and the chamber is maintained at approximately 600 degrees Celsius.

* * * * *